(12) United States Patent
Meier et al.

(10) Patent No.: US 7,519,817 B2
(45) Date of Patent: Apr. 14, 2009

(54) METHODS, SYSTEMS AND SOFTWARE APPLICATIONS FOR VERIFYING CERTAIN REQUIREMENTS ON ELECTRONIC DOCUMENTS

(75) Inventors: Beat Meier, Uitlkon (CH); Anton Meier, Oberwil-Lieli (CH)

(73) Assignee: SAP AG, Walldorf (DE)

( * ) Notice: Subject to any disclaimer, the term of this patent is extended or adjusted under 35 U.S.C. 154(b) by 825 days.

(21) Appl. No.: 11/081,688

(22) Filed: Mar. 17, 2005

(65) Prior Publication Data

US 2005/0210256 A1 Sep. 22, 2005

(30) Foreign Application Priority Data

Mar. 17, 2004 (EP) .................................. 04006342

(51) Int. Cl.
H04L 9/00 (2006.01)

(52) U.S. Cl. .......................... 713/168; 713/170; 713/176

(58) Field of Classification Search ................. 713/168, 713/170, 175–176, 178, 181; 726/27–30
See application file for complete search history.

(56) References Cited

U.S. PATENT DOCUMENTS

| | | | | |
|---|---|---|---|---|
| 6,587,945 | B1 * | 7/2003 | Pasieka | ....................... 713/176 |
| 7,181,472 | B2 * | 2/2007 | Cameron et al. | ............ 707/201 |
| 2002/0099938 | A1 | 7/2002 | Spitz | |
| 2003/0126085 | A1 | 7/2003 | Srinivasan | |

FOREIGN PATENT DOCUMENTS

EP 0 689 316 A2 12/1995

EP 1 251 421 A2 10/2002

OTHER PUBLICATIONS

Council Directive 2001/115/EC of Dec. 20, 2001, located at http://europa.eu.int/eur-lex/lex/LexUriServ/LexUriServ.do?uri=CELEX:32001L0115:EN:HTML (6 pages).

(Continued)

*Primary Examiner*—Hosuk Song
(74) *Attorney, Agent, or Firm*—Finnegan, Henderson, Farabow, Garrett & Dunner, L.L.P.

(57) ABSTRACT

Methods, systems and software applications are provided for automatically processing an electronic document having a digital signature. In one implementation, a method is provided that comprises sending the electronic document from a sender to a designated receiver. The method further includes, on the designated receiver's or a third party's computer system, (a) receiving the electronic document from the sender, (b) validating the digital signature, and (c) checking whether the digital signature is from a person or legal entity authorized to send the electronic document. If the person or legal entity is authorized to send the electronic document, the method may further include (d) checking whether the person or legal entity that signed the document is authorized by an issuer of the electronic document, and (e) creating an electronic protocol of the results of steps (b), (c) and (d). As disclosed herein, the method may further include (f) signing the protocol, (g) archiving the protocol, the electronic document, or both, and (h) presenting the electronic document to the designated receiver.

32 Claims, 5 Drawing Sheets

OTHER PUBLICATIONS

Report and Recommendations of CEN/ISSS e-Invoicing Focus Group on Standards and Developments on electronic invoicing relating to VAT Directive 2001/115/EC, (Final Report, Sep. 15, 2003, located at http://www.cenorm.be/cenorm/businessdomains/businessdomains/isss/activity/finalreporteifg1.zip (145 pages).

Press Release: VAT: Commission reviews and updates strategy for improving the operation of the EU VAT system, dated Oct. 24, 2003, located at http://europa.eu.int/rapid/pressReleasesAction.do?reference=IP/03/1447&format=HTML&aged=1&language=EN&guiLanguage=en (2 pages).

"Recommended Practice for Message Flow and Security for Edifact Payments," dated Oct. 1, 2000, pp. 53-56, XP002299307, retrieved from the Internet: URL:http://wwunece.org/trade/untdid/mig/d6_rec_practices.pdf, retrieved on Oct. 5, 2004.

PCT Search Report for PCT/EP2005/050550, dated Jun. 9, 2005, 4 pages.

* cited by examiner

METHODS, SYSTEMS AND SOFTWARE APPLICATIONS FOR VERIFYING CERTAIN REQUIREMENTS ON ELECTRONIC DOCUMENTS

BACKGROUND INFORMATION

1. Field of the Invention

The present invention generally relates to electronic data processing. More particularly, embodiments of the invention relates to methods, computer program products and systems for verifying certain legal requirements on electronic documents.

2. Background of the Invention

Data processing is commonly used, e.g., in the fields administration and management of enterprises, cost accounting, cost allocation, and bookkeeping. In various countries, recommendations and legal regulations have been released for the exchange of electronic documents in order to make the electronic exchange of documents and the electronic document itself suitable for being acknowledged as "documents" in the legal sense, in the same way as traditional paper documents are. Examples for such recommendations are:

European Union (EU) VAT Guidelines under <http://europa.eu.int/smartapi/cgi/sga doc?smartapi!celexapi!prod!CELEX numdoc&lg=de& numdoc=32001L0115&model=guichett>, CEN-Report for eInvoicing (Oct. 2003) under <http://www.cenorm.be/cenorm/businessdomains/businessdomains/informationsocietystandardizationsystem/ebusiness+and+ecommerce/einvoicing+focus+group/index.asp>, and Updates for VAT Regulations in the EU (27Oct. 2003) under <http://europa.eu.mt/comm/taxation customs/publications/info doc/info d oc.htm#VAT>.

In Germany, electronic documents, particularly electronic invoices, are acknowledged as documents in a legal sense provided that the electronic document (invoices) is digitally signed, that the receiver of the document verifies the signature, and that the receiver archives the document. Further, the signature has to comply with the German signature law. This means that the signature has to be a qualified signature. Further requirements on electronic documents, particularly invoices, are based on the principles of orderly bookkeeping. Prerequisites for an acknowledged archiving in a legal sense comprise that the electronic document to be archived has a qualified signature in case of electronic invoices, that the electronic document is stored on an unchangeable storage medium, that converted and unconverted data are archived with respect to an index comprising a link to a converting mechanism if applicable, and that the archiving procedure is recorded.

Software applications and systems which provide a solution to part of the regulations pointed out above are known from the state of the art. For instance, Seeburger AG, D-75015 Bretten/Baden (www.seeburger.de) provides a software application for sending and receiving electronic invoices. The sending module on a sender's computer system allows for creating a digital signature for a document, creating an envelope comprising the document and the encrypted signature, and sending the envelope to a receiver module on a receiver's computer system. The term "signed document" is hereinafter alternatively used for the envelope. Creating a digital signature comprises calculating a hash value which is unique for the document to be sent. The hash value is then encrypted by a private key and optionally converted into an ASCII code string (BASE64 encoding). Suitable signature processes are, for instance, S/MIME or SECURE EDIFACT/AUTACK message according to DIN/ISO 16560-15 or -16.

The receiver module on a receiver's computer system allows for receiving the electronic document via a communication interface, decrypting the signature by means of a public key of the sender, validating the signature, archiving the document, the signature, the public key of the sender, the result of a converting process, if applicable, and a report of these various processes, and passing the document to a business software system of the receiver. Validating the signature may, for example, be implemented by a method comprising calculating a hash value of the document by means of the same process that has been applied on the sender side and comparing that calculated hash value with the hash value obtained by decrypting the signature received with the document using the public key of the signer. Identity of both values reveals the originality and integrity of the document.

Another example of how to process signed electronic documents is known from U.S. Pat. No. 6,587,945. This document describes a method for automatically processing an electronic document having a digital signature, wherein the processing comprises sending the document from a sender to a receiver and verifying the signature.

However, as a drawback, the above applications do not allow the receiver to check whether the person who signed the document is authorized to sign the document and to check whether the person, if authorized, corresponds to the issuer of the document. For example, in a business to business scenario, where the sender is authenticated automatically, the signature is verified, the signer is authorized as a business partner, and the document is accounted, the important check is missing as to whether the signer is authorized to sign for the business partner named in the document. These steps have still to be performed manually, requiring a considerable amount of time and costs.

In the field of electronic invoicing, customers are doing electronic invoicing today, but additionally they have to send paper invoices because of legal requirements. These invoices or in some cases collective invoices have to be matched manually with the electronic invoices. This is why some customers might not do electronic invoicing at all.

In view of the foregoing, there is a need for methods, software applications and/or data processing systems for providing a more efficient solution of at least a part of the problems described above. Particularly, it is desirable to provide a software application having a mechanism processing electronic documents more efficiently.

The above description is based on the knowledge of the present inventors and not necessarily that known in the art.

SUMMARY OF THE INVENTION

In accordance with embodiments of the present invention, as embodied and broadly described herein, methods, software applications and systems are provided for automatically processing a first electronic document sent from a sender to a designated receiver, the first electronic document having a digital signature.

According to one embodiment, a method is provided that comprises: a) receiving the first electronic document from the sender, b) validating the digital signature, c) checking whether the digital signature is from a person or a legal entity authorized to send the first electronic document, d) determining, if the person or the legal entity is authorized to send the first electronic document, whether the person or the legal entity that signed the first electronic document is authorized by an issuer of the first electronic document, e) creating an electronic protocol of the results of validating, checking, and determining in steps b), c), and d), f) signing the protocol, g) archiving the protocol and/or the first electronic document, and h) presenting the first electronic document to the designated receiver.

The above described method may ensure for a designated receiver not only that he/she receives documents, particularly invoices, which is validly signed, but also that the signature is from a person who is allowed to sign the document, thereby increasing security. Background is that a signature, although technical correct, may be from a person who is not allowed signing such a document. The exemplary method is further not only advantageous as it can be used to automate business processes and to reduce work, working time, and costs, but it also creates electronic documents, namely log files and archives, which can be taken as a prove in the legal sense for having complied with legal requirements on electronic data exchange. A further advantage is that an enterprise can outsource steps a) to h) to a service provider who runs a corresponding software application performing the method on a separate computer system. This is particularly advantageous for small and medium size enterprises, which are not capable of running an extended IT infrastructure. The service provider in such a scenario may receive a document for the enterprise, process that document as described, and finally forward it to the designated receiver, the enterprise. Thus, the above described method covers a first scenario where the designated receiver processes the document itself and a second scenario where the document is received by a party different to the designated receiver of the document. This different (third) party processes the document as described and then presents the document to the designated receiver. In both cases, the document is received by a further processing module in the computer system of the designated receiver.

In the field of electronic invoicing, the additional sending of paper invoices can be omitted, resulting in a large cost reduction. Keying in of invoice data or matching of paper invoices with electronic invoices is no longer necessary.

Consistent with the exemplary method, billers get their bills paid faster resulting in a lower "day's sales outstanding", and risk can be reduced by conforming to legal requirements. In addition, the customer (receiver) can reduce fraud and errors due to data integrity.

Embodiments of the invention are further directed to computer systems, computer programs, computer readable media, and carrier signals, each comprising program code or instructions for processing electronic documents according to, for example, the above described method.

Such computer programs can be installed as one or more programs or program modules on different hardware systems (computers or computer systems), and/or can run separately and independently of each other, in their entirety being capable of performing embodiments of the invention. The different systems may be connected in the form of a network to communicate with each other.

Additional objects and advantages of the various embodiments of the invention will be set forth in part in the description, or may be learned by practice of the invention. The objects and advantages of the embodiments of the invention will be realized and attained by means of the elements and combinations particularly pointed out in the appended claims. Embodiments of the invention are disclosed in the detailed description section and in the appended independent and dependent claims.

The various embodiments can include and/or exclude different aspects, features and/or advantages, where applicable.

In addition, various embodiments can combine one or more aspects or features of other embodiments, where applicable.

It is understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

BRIEF DESCRIPTION OF THE DRAWINGS

Both the foregoing general description and the following detailed description are exemplary and explanatory only. They do not restrict the invention, as claimed. Furthermore, the accompanying drawings, which are incorporated in and constitute a part of this specification, illustrate embodiments of the invention and together with the description, serve to explain the principles of the invention. In the drawings:

DETAILED DESCRIPTION

Figure 1:
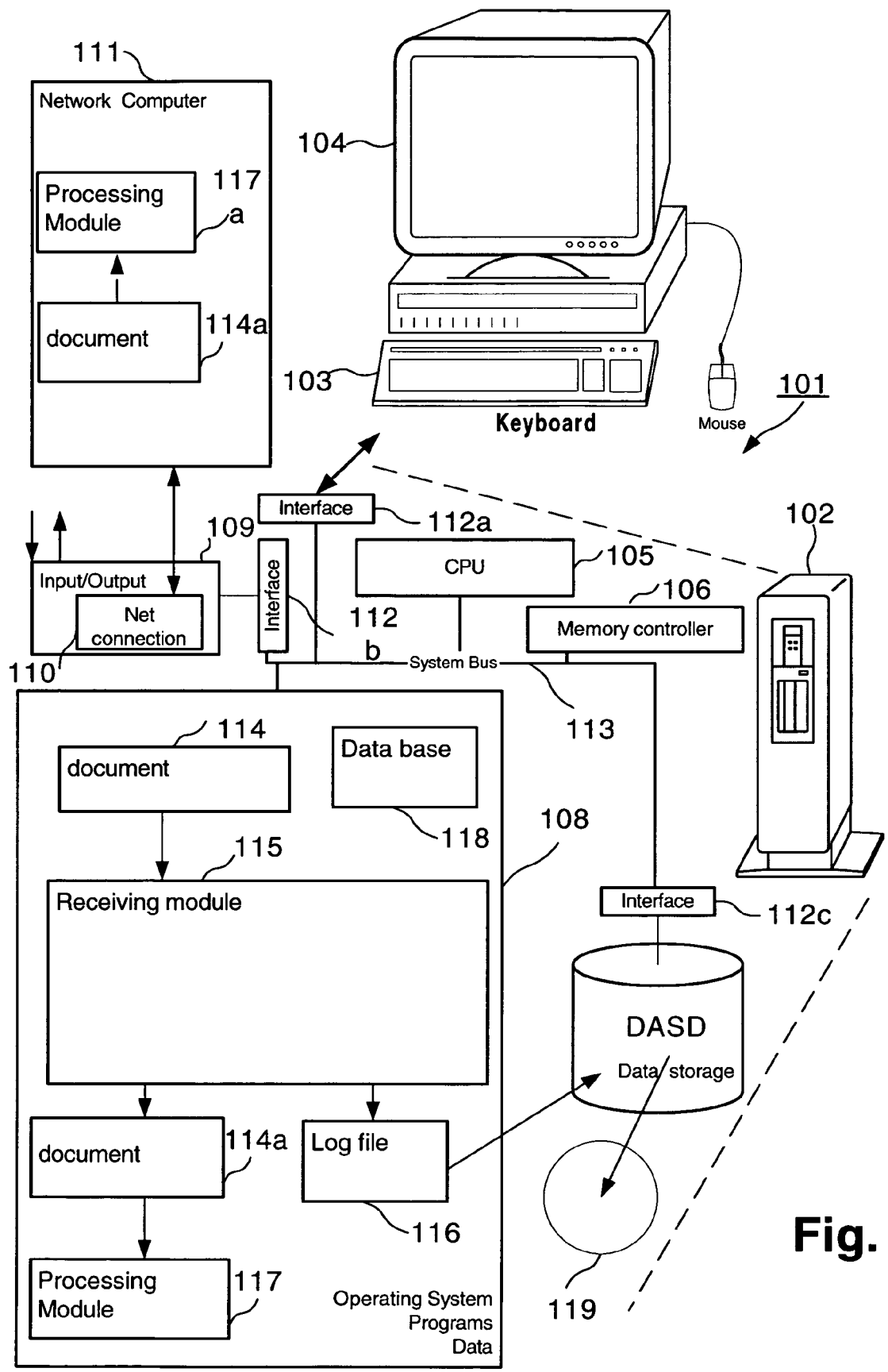
FIG. 1 is a block diagram illustrating an exemplary system for verifying certain requirements on electronic documents, consistent with an embodiment of the present invention.

Within this disclosure, the terms used shall have their usual meaning in the context of the field of data processing, unless defined otherwise. Particularly, a computer system broadly refers to any stand alone computer such as a PC or a laptop or a series of computers connected via a network, e.g., a network within a company, or a series of computers connected via the internet. Computer systems and programs may be closely related. As used herein, phrases, such as "the computer provides" and "the program provides or performs specific actions", "a user performs a specific action" are used to express actions by a computer system that may be controlled by a program or to express that the program or program module may be designed to enable the computer system to perform the specific action or to enable a user to perform the specific action by means of a computer system. In this context, the term "automatically" is not intended to exclude a user's interactions with the computer system in the course of processing.

It should be understood that the term "presentment" as used herein broadly refers to the specialized definition normally associated with commercial paper (i.e., the production on a negotiable instrument to a drawee), as well as to providing information via electronic means. For example, this electronic presentment may be through the use of an Internet-or intranet website or via e-mail or SMS, e.g., by making a web site accessible to one or more persons. Electronic presentment may also take place by sending computer readable storage media, like disks, ZIP disks, magneto-optical disks, CDs, R/W discs, DVD ROMs etc., e.g., via standard mail.

The disclosed methods and features as described herein may be implemented, for example, by means of a computer system and computer software which allows processing business software applications and which allows the use of databases or database applications and Internet applications.

In the exemplary method described in the Summary section, step c) may be implemented, for example, by means of a database in which a list of persons, who are authorized to send an electronic document, is stored. Such a database may be queried by a software module in order to compare the name of the person derived from the signature with the names stored in the database. Another possibility of an implementation is to provide the software module, which checks the authorization, with a list of authorized persons via an interface. Such database or such list may be created by the receiver prior or during the installation of the system. It may also be amended or changed at any time.

Step d) may be implemented, for example, by automatically comparing the name derived from the signature with the name of the issuer of the document. This name is usually contained in the document, for example, the name of a biller, if the document is an invoice.

This step may additionally or alternatively be implemented by assigning a signer's ID or certificate number or distinguished name to identifiers of one or more persons or legal entities, which may thus be defined as valid persons or legal entities, for which the signer is authorized to sign documents. This may be implemented by means of a table. If the check or the method is performed on the third party's computer system, such table may be available (stored) in that system or may be provided to the system when calling it.

Since an electronic document may contain different names of persons or legal entities in different fields, which may have field names or field IDs, a further list or table may be provided, which contains such IDs or names of data fields, which are relevant to check for the name of the issuer of the document. For example: If an electronic invoice contains fields having field names "invoicing party", "supplier", "distributor", "invoice recipient", "goods recipient" and the like, such list or table may contain the field name "invoicing party" for determining the field, which has to be checked for the issuer.

Step e) may be implemented, for example, by automatically creating a log file into which entries of the results of steps b), c), and d) are made. In an embodiment consistent with the present invention, the log file is a XML file. The signing of the log file in step f) may be implemented according to methods known in the art. Step h) may be implemented, for example by presenting the electronic document to a processing module of a receiver's business software system. This includes that the receipt of the electronic document may also take place within the receiver's computer system by a suitable receiving module.

A further embodiment of the inventive method as described in the Summary section is characterized in that the method further comprises a step i) of converting the electronic document into a format supported by the receiver.

Electronic documents may be received in any conventional format, for example as structured document like XML, HTML, EDIFACT, SWIFT document or in a customer specific record format. The term "structured document" thereby broadly refers to documents, which contain an application related assignment of values, e.g. XML, or to documents for which such assignment is contained in a separate electronic document, e.g., EDIFACT.

In the field of electronic invoicing, electronic invoices may be of the type EDIFACT, XML, HTML, and/or IDOC.

In case the software system of the designated receiver requires a certain format for processing electronic documents, the electronic document can be converted into such format before sending to the designated receiver in step h).

Step h) may be performed parallel to steps e) to g).

A further embodiment of the inventive method is characterized in that the method further comprises j) requesting a time stamp from a trusted authority and adding the time stamp to the electronic document before steps g) or h) and/or to the electronic protocol before step f). A trusted authority, for example, may be TC Trust Centre (e.g., www.tctrust-center.de).

A further embodiment comprises k) creating a second digital signature of the electronic document using a certificate of an authorized person or legal entity, creating a second electronic document, which may be a non-repudiation of receipt (NRR), comprising the second digital signature, and presenting that second electronic document to the sender of the first electronic document.

A further embodiment comprises in step k) creating the digital signature by calculating a hash value of the electronic document and encrypting the hash value using the private key of the receiver.

By means of both methods, a so called non-repudiation of receipt (NRR) may be created and sent back to the receiver for any documents received. This can be taken by the sender as non-rebuttable prove that the receiver has received the document. The second document may be implemented as a XML-document containing the signature and all relevant information to decrypt the signature and obtain the hash value.

A further embodiment comprises archiving the second electronic document.

Another embodiment comprises presenting the archived data to the receiver and/or to the sender of the first electronic document. This may be implemented, for instance, by automatically creating CD/DVD-ROMs containing the archived data and sending the CD/DVD-ROMs to the sender/addressee.

A further embodiment comprises in case the first electronic document is a NRR of a credit note previously sent to the sender, checking whether the NRR matches with the previously sent credit note. This step nay, for example, be implemented by calculating and comparing the hash value of the previously sent credit note with the hash value obtained from the NRR. This embodiment may further comprise validating the digital signature in the NRR.

In a further embodiment, the first electronic document is an invoice or a credit note. However, any type of document, e.g., purchase orders, delivery notes, contracts, letters, faxes, may be processed by the disclosed invention and its embodiments.

In a still further embodiment, the method is transparently integrated into an exchange path between a sender application of the sender and a receiver application of the receiver. The term "transparently" thereby broadly refers to the property of the method of being "invisible" to the sender and receiver application. This has an advantageous technical consequence that these applications do not need to be modified in order to make use of the invention.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, application-specific integrated circuits (ASICs).

To provide for interaction with a user, the invention can be implemented on a computer system having a display device such as a cathode ray tube (CRT) or liquid crystal display (LCD) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or haptic feedback; and input from the user can be received in any form, including acoustic, speech, or haptic input.

Reference will now be made in detail to the principles of the invention and its embodiments by an explanation on the basis of a data processing process, examples of which are illustrated in the accompanying drawings.

Referring now to FIG. 1, an exemplary computer system 101 is provided that comprises a computer 102 and operating means 103, 104, in accordance with an embodiment of the present invention. Those skilled in the art will appreciate that implementations consistent with the present invention apply equally to any computer system, regardless of whether the computer system is a complicated multi-user computing apparatus or a single user device such as a personal computer or workstation.

Computer 102 suitably comprises a processor 105, a main memory 108, a memory controller 106, an auxiliary storage interface 112c, a general input/output interface 112b and a terminal interface 112a, all of which are interconnected via a system bus 113. Note that various modifications, additions, or deletions may be made to computer system 101 illustrated in FIG. 1 within the scope of the present invention, such as the addition of cache memory or other peripheral devices. FIG. 1 is presented to simply illustrate some of the salient features of computer system 101.

Processor 105 performs computation and control functions of computer system 101, and comprises a suitable central processing unit (CPU). Processor 105 may comprise a single integrated circuit, such as a microprocessor, or may comprise any suitable number of integrated circuit devices and/or circuit boards working in cooperation to accomplish the functions of a processor. Processor 105 may suitably execute (object-oriented) computer programs within main memory 108. Auxiliary storage interface 112c allows computer system 101 to store and retrieve information from auxiliary storage devices, such as magnetic disk (e.g., hard disks or floppy diskettes) or optical storage devices (e.g., CD-ROM). One suitable storage device is a direct access storage device (DASD) 107. As shown in FIG. 1, DASD 107 may be a hard disk drive which may read programs and data from a hard disk. It is important to note that while embodiments of the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Further examples of signal bearing media include: recordable type media such as floppy disks and CD ROMS, and transmission type media such as digital and analogous communication links, including wireless communication links.

Memory controller 106, through use of a processor, is responsible for moving requested information from main memory 108 and/or through auxiliary storage interface 112c to processor 105. While for the purposes of explanation, memory controller 106 is shown as a separate entity; those skilled in the art understand that, in practice, portions of the function provided by memory controller 106 may actually reside in the circuitry associated with processor 105, main memory 108, and/or auxiliary storage interface 112c. Terminal interface 112a allows system administrators and computer programmers to communicate with computer system 101, normally through monitor 104, keyboard 103, mouse, trackball and the like or through programmable workstations.

Although the system 101 depicted in FIG. 1 contains only a single main processor 105 and a single system bus 113, it should be understood that the present invention applies equally to computer systems having multiple processors and multiple system buses. Similarly, although the system bus 113 of the embodiment is a typical hardwired, multidrop bus, any connection means that supports directional communication in a computer-related environment could be used.

Input/output interface 112b allows computer system 101 via processor 105 to communicate with general input/output means 109, including a net connection 110, for sending and/or receiving data, e.g. for a net connection with one or more further computer systems 111, or for sending or receiving of data to or from other parties. A plurality of computer systems like computer system 101 can be connected via the net connection 110 in the form of a network. In such a case, the network computers 111 can be used as further input/output means, including the use as further storage locations.

In one embodiment, memory 108 suitably includes an operating system, programs and data, particularly an electronic document 114, receiving module 115, a converted electronic document 114a, a log file 116, a processing module 117, a database 118 available via DASD storage 107, and a CD/DVD burner 119. It should be understood that for purposes of this application, in memory 108 is used in its broadest sense, and can include Dynamic Random Access Memory (DRAM), Static RAM (SRAM), flash memory, cache memory, etc. While not explicitly shown in FIG. 1, memory 108 may be a single type of memory component or may be composed of many different types of memory components. For example, memory 108 and CPU 105 may be distributed across several different computers that collectively comprise system 101. It should also be understood that programs in memory 108 can include any and all forms of computer programs, including source code, intermediate code, machine code, and any other representation of a computer program.

The operating system provides the basic functionality that controls the computer system 101. Operating system can comprise any suitable operating system, such as IBM's OS/400, OS/2, Microsoft's Windows, Java and the various flavours of UNIX. The database 117 provides the mechanism for persistently storing object data in the computer system 101, and can be any suitable, preferably relational database such as those available from IBM, Oracle or Microsoft.

Those skilled in the art will appreciate that more than one of the mentioned processors may work in parallel in a computer system.

When operating computer system 101, an electronic document 114 may be received by receiving module 115 from a sender application via network connection 110. Receiving module 115 validates the signature of the document 114 by using the public key of the sender of the document. It is clear that the public key has to be requested from the sender or the Certificate Agency prior to use, if it is not contained in the electronic document. Receiving module in 115 retrieves the name of the person who signed the document from the signature or the public key and compares the name with the names of authorized persons contained in data base 118. In case the name is not in the database, the received document 114 may be deemed to be defective and may be refused. A corresponding notice may be automatically sent to the sender by e-mail, for instance. In case the signature is from an authorized person, receiving module 115 further checks whether the name of the authorized person corresponds to the issuer of the document 114. This may be implemented, for example, by checking whether the name is contained in an address section or a specified field in document 114. Receiving module 115 then creates a log file 116 and writes the results of the previous checking steps into that file, for instance by storing pre-settable text strings having a corresponding meaning, for instance "signature recognized" or the like, into the log file. In one embodiment, a time stamp may be added to the log file. Receiving module 115 then signs the log file by means of a pre-settable digital signature of the receiver. Receiving module 115 further archives the log file and/or the received document 114 in its original form on a CD/DVD ROM 119 or on other suitable unchangeable storage media. Receiving module 115 also checks, whether the processing module 117 of the business software requires that documents like document 114 have to be provided in a certain format, e.g. a presentable or "human readable" format like Word or PDF. In case the format of document 114 as received does not match with the required format, document 114 is converted into the appropriate formatted document 114a. The converted document 114a and certain or all results of conversion process may also be archived and documented in the log file, respectively. In case the process runs on a computer system 101 of the designated receiver, document 114, 114a is presented to processing module 117 for further processing. Alternatively, in case the process runs on a computer system 101 of a person (third party) different from the designated receiver, document 114, 114a is presented via net connection 110 to processing module 117a running in a computer system 111 of the designated receiver for further processing.

Figure 2:
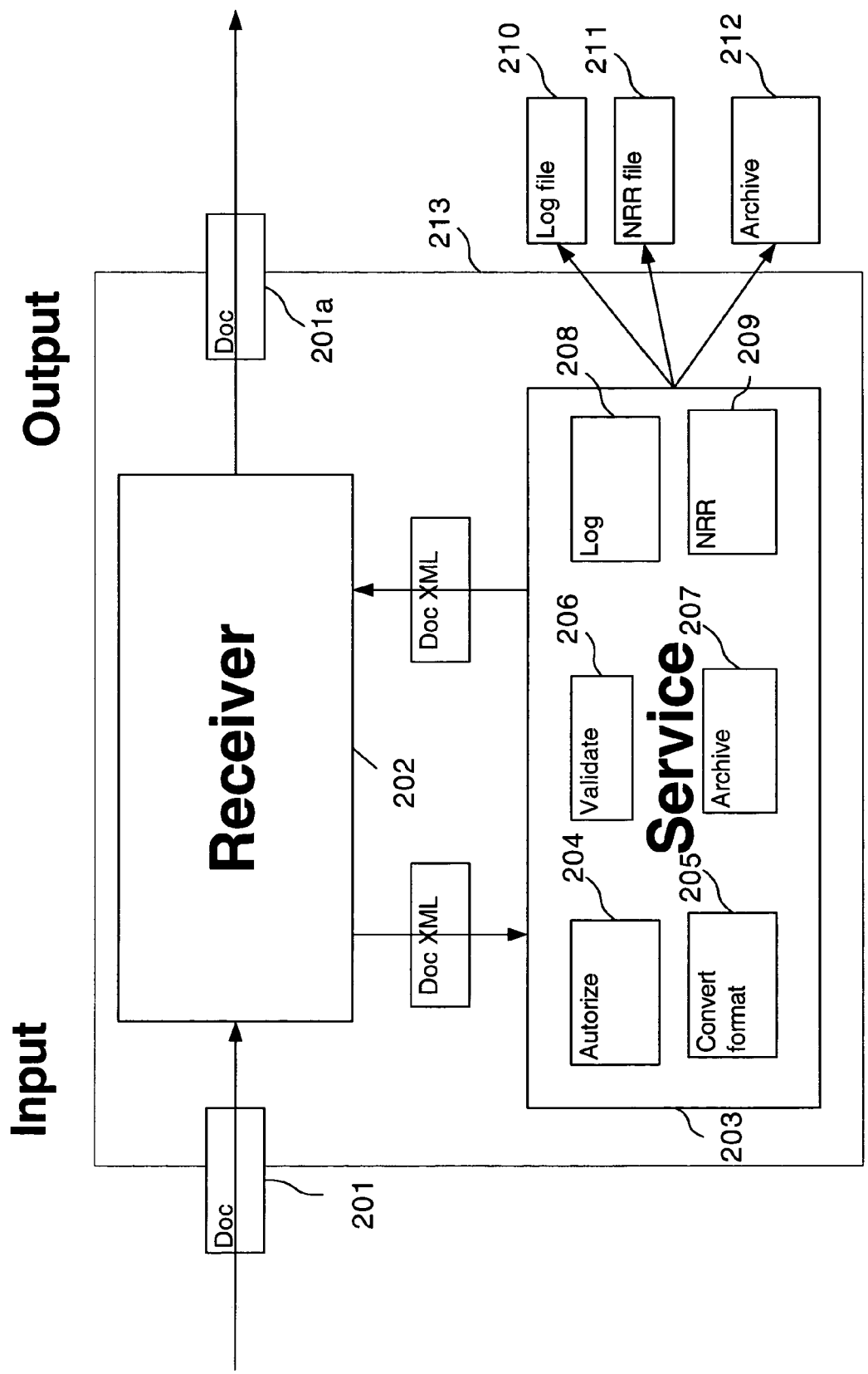
FIG. 2 is a block diagram illustrating an exemplary system for verifying certain requirements on electronic documents, consistent with an embodiment of the present invention.

Referring now to FIG. 2, a further embodiment is illustrated by a main memory 213 of a computer system, like the one shown in FIG. 1. Main memory 213 comprises a receiver service 202, 203 comprising a receiver module 202, and a service module 203. Service module 203 comprises a module 204 for validating a signature of a digitally signed document 201, a module 206 for checking the authorization of the person who signed document 201, a module 208 for creating a log file 210, a module 205 for converting the format of the document 201, if requested, a module 207 for archiving document 201 and log file 210 into an archive file 212, and a module 209 for creating a NRR-document 211.

When operating that system, a digitally signed document 201 may be received by receiver module 202. Receiver 202, preferably based on processes or business processes defined for the received document, passes the document 201 to service module 203. Within service module 203, module 204 validates the signature and module 206 checks the authorization, i.e., module 206 checks whether the name of the authorized person corresponds to the issuer of the document. Module 205 converts format if so requested. For example, if a business software of the receiver requires that invoices have to be of EDIFACT type, and the electronic document is of IDOC type, then module 205 converts the electronic invoice from IDOC type to EDIFACT type. Module 208 creates the log file 210, and module 207 archives the document 201 and the log file 210 into archive 212. If requested, module 209 may create a NRR-document 211, which may then be sent back to the sender. The processes performed by modules 204 to 209 may run independently of each other, in parallel, or in series. Document 201 is then passed back to receiver module 202, which sends it as document 201a to the designated receiver. If the process already runs on a computer system of the designated receiver, this step may be implemented by sending the document to a processing module within that computer system or by presenting it to a user of that computer system for initiating further actions. If the process runs on the computer system of a party different to the designated receiver, this step may be implemented by sending document 201a to the computer system of the designated receiver for being further processed by a processing module or by a user as pointed out above.

Figure 3:
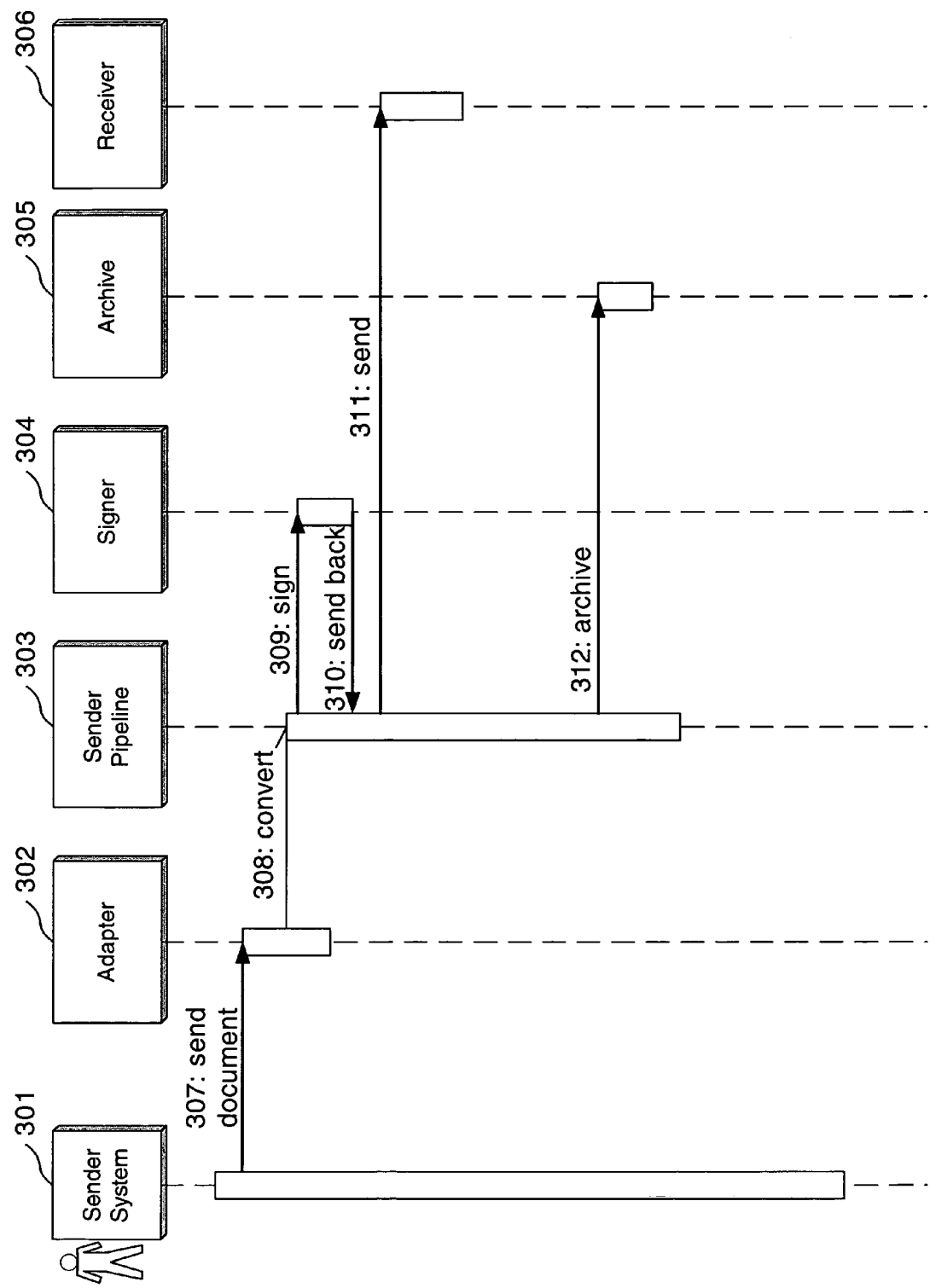
FIG. 3 is a sequence diagram illustrating exemplary interactions between program modules and data while sending an electronic document, consistent with an embodiment of the present invention.
Figure 4:
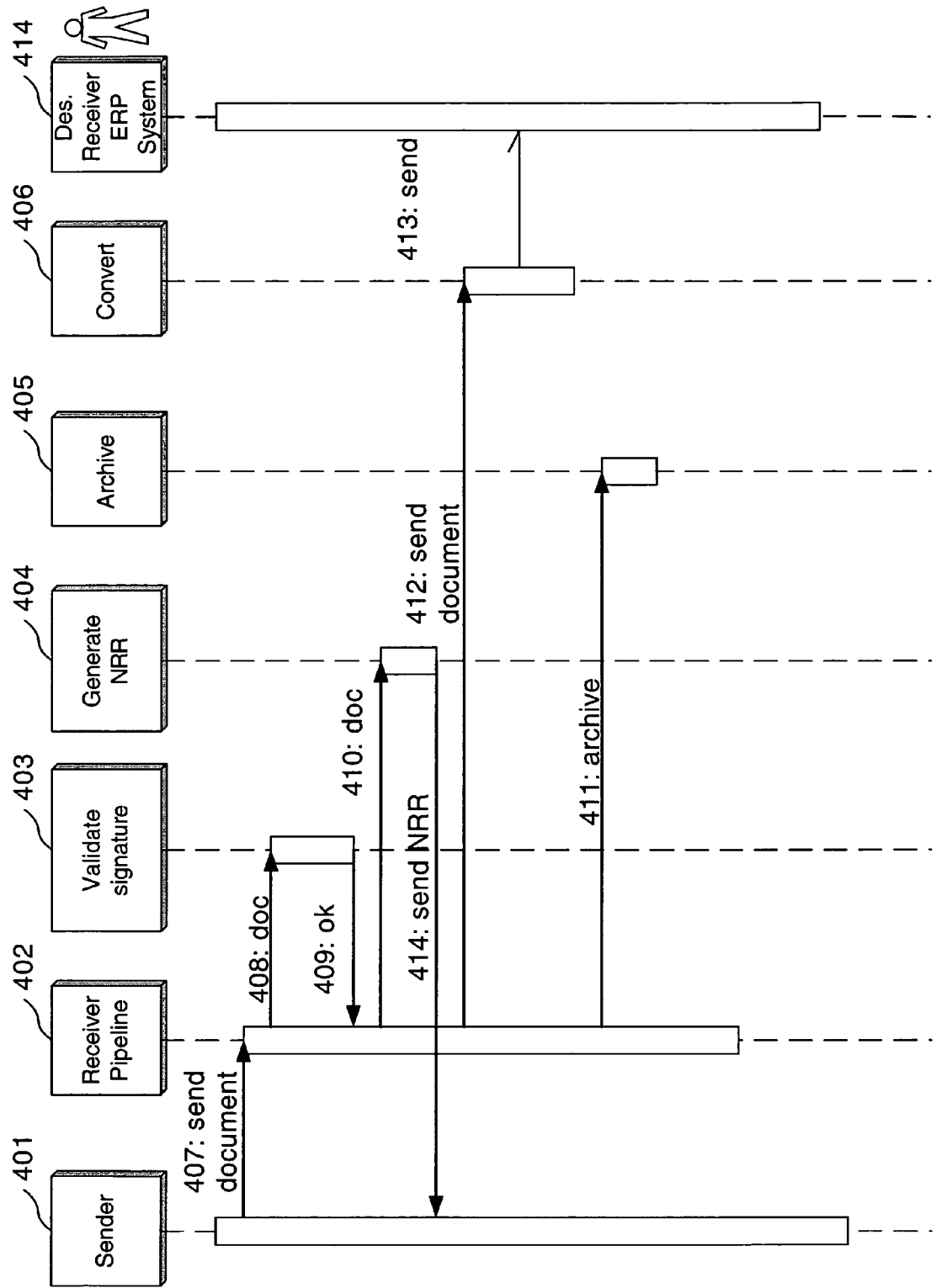
FIG. 4 is a sequence diagram illustrating exemplary interactions between program modules and data according to a further exemplary embodiment of the invention.

Referring now to FIGS. 3 and 4, a further embodiment of the invention is illustrated by way of two exemplary sequence diagrams, which show an overall process of sending and receiving a digitally signed document by means of the sender process shown in FIG. 3 and the receiver process according to a further embodiment of the invention shown in FIG. 4. In a computer system 301, a sender a document is sent in a step 307 to an adapter module 302. Adapter module 302 converts the document in a step 308 into a pre-settable format and passes the converted document to a sender pipeline module 303. The sender module 303 passes the document in a step 309 to a signer module 304, which digitally signs the document and passes it back to the sender module 303 in step 310. The sender module 303 then sends the signed document in step 311 to a receiver 306. Additionally, sender module 303 passes the document in a step 312 to an archiving module 305, which archives a copy of the sent document on an unchangeable storage medium. In one embodiment, receiver module 306 in FIG. 3 may represent a receiver module like the receiver pipeline 402 in FIG. 4.

Referring now to FIG. 4, a receiver pipeline module 402 receives in a step 407 a digitally signed document from a sender application 401, which may represent a sender module like sender pipeline module 303 from FIG. 3, as well as a general sender/receiver module. Receiver pipeline 402 sends in step 408 the document to a validation module 403, which validates the signature and checks the authorization of the person who signed the document, i.e., it checks whether the name of the authorized person corresponds to the issuer of the document. In case the signature is validated and the person is recognized as authorized, validation module 403 returns a corresponding "ok" message in step 409 to the receiver pipeline 402. Receiver pipeline 402 may then present the document to a NRR-generator module 404, which generates a NRR-document from the document for sending it back to the sender in step 414. Receiver pipeline 402 passes the document to a conversion module 406, which converts the document in to a format supported by the business software 414 of the receiver. After conversion, the document is sent to a receiver module of software 414 of the designated receiver. Receiver pipeline 402 further creates a log file, which comprises information on all or parts of the results of the performed processes. Such information may comprise: transaction reference, message reference, sender ID, result of signature validation including signer certificate ID, certificate revocation list ID, signing date and time, signature check date and time, result of signature checks, result of certificate validation check, result of certificate revocation check, result of the authorization check. Such log file is then presented to an archive module 405, which archives the data on an unchangeable storage medium. The archive, may be designed such that log files and documents can be accessed, viewed and extracted, the documents for example by name of the sender or a VAT number of a biller or a invoice message reference or the like as may apply.

Modules 402 to 406 may be implemented to run on a computer system of a service provider, which computer system may be connected to the computer systems of sender and receiver via a network connection, for example, the Internet or an intranet. The documents may also be presented via electronic mail.

Figure 5:
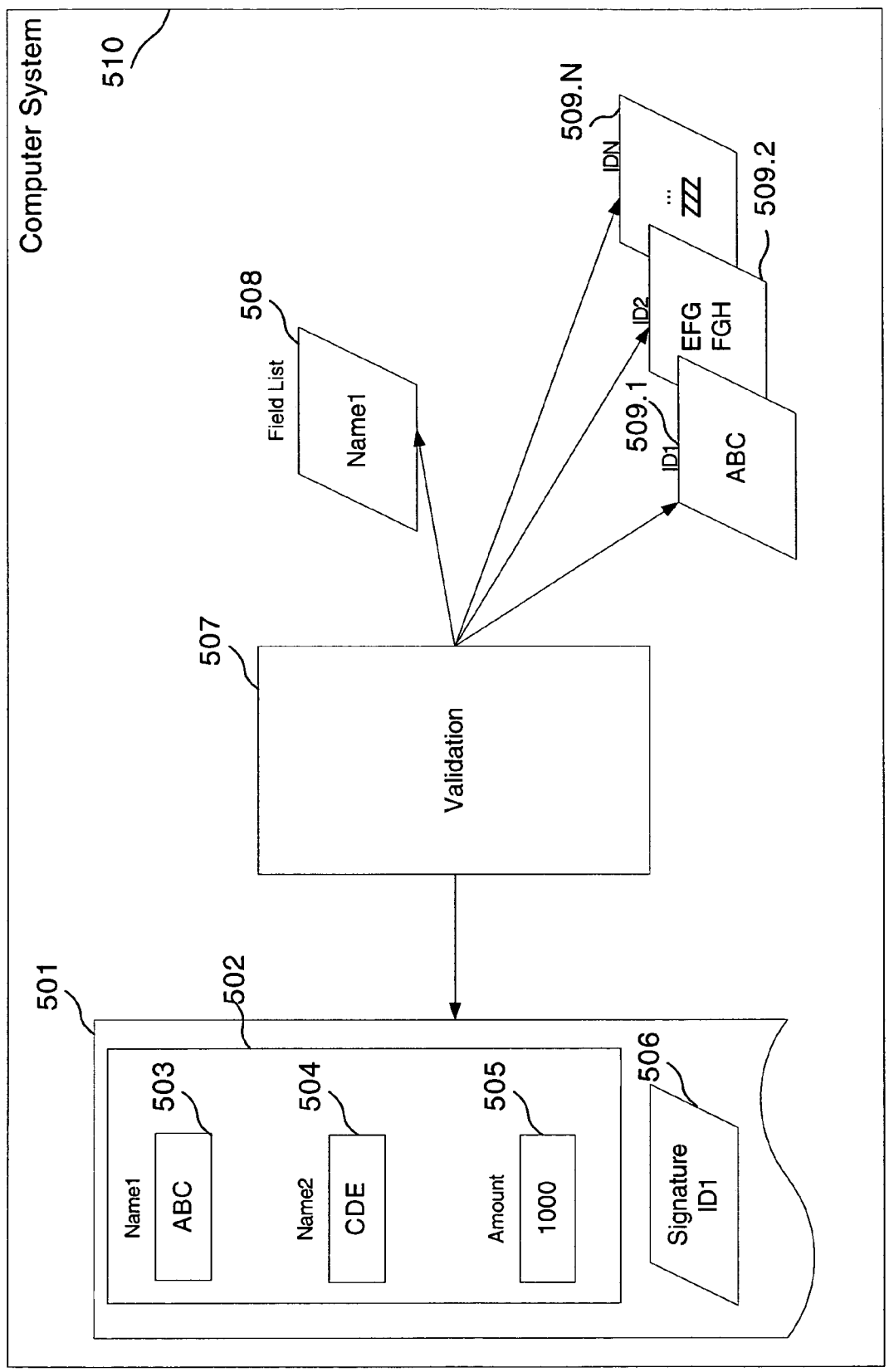
FIG. 5 illustrates an exemplary system for checking whether a person or legal entity that signed the document is authorized by an issuer of the electronic document, consistent with an embodiment of the present invention.

Referring now to FIG. 5, a further embodiment of the invention is illustrated by means of a schematic block diagram showing a possible implementation of validation step d) performed by a validation module 507. The figure shows, within a computer system 510, an electronic document 501 comprising a document 502 and a digital signature 506 of document 502. Document 501 is usually called "envelope". Document 502 comprises one or more data fields 503, 504 having the names "name1", "name2". Document 502 further comprises a data field 505 having the name "amount". Further data fields may be present. In case document 502 relates to an electronic invoice, data field 503 may contain the issuer of the document, for example of the invoicing party, and data field 504 may contain the name of the receiver of the document 501, for example the name of the recipient of the invoice. Data field 505 may contain the amount of the invoice. The data fields may contain additional information, as pointed out above. The digital signature 506 comprises an identifier ID1 of the signer of the document. FIG. 5 further shows a list 508, which contains a list of names of fields contained in document 502, which have to be queried when searching for the issuer of the document 503. In the example the data field having the name "name1" has to be queried. FIG. 5 further shows lists 509.1 to 509.N, each list assigning to a possible signer of a document 502, identified by an identifier ID1 to IDN, one or more names of persons were legal entities, for which the signer is deemed to be an authorized signer of the document 502, in the example of the invoice. In the example, the signer having the identifier ID1 is deemed to be allowed to sign for a person named ABC, and a signer having the identifier 1D2 is deemed to be allowed to sign for a persons were legal entities named EFG and FGH. During run-time, validation module 507 identifies by means of list 508 that data field 503 in document 502 has to be checked for the name of the issuer of the document 502. From the identifier ID1 contained in signature 506, validation module 507 determines from list 509 1 that the signer of document 502 is allowed to sign only for a person named ABC. Validation module 507 then checks whether the name contained in data field 503 matches with the list of allowed names. In the example, the result of the validation step is that the persons or legal entity who signed the document is authorized to do that.

Modifications and adaptations of the present invention will be apparent to those skilled in the art from consideration of the specification and practice of the embodiments of the invention disclosed herein. The foregoing description of implementations of the invention has been presented for purposes of illustration and description. It is not exhaustive and does not limit the invention to the precise forms disclosed. Modifications and variations are possible in light of the above teachings or may be acquired from the practicing of the disclosed embodiments of the invention. For example, the described implementations include software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

While illustrative embodiments of the invention have been described herein, the present invention is not limited to the various embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

The patent claims submitted with the application are wording proposals without prejudice for attaining extended patent protection. The applicant reserves the right to claim further combinations of features previously disclosed only in the description or any other combinations of features disclosed in the description. Expressions in brackets in the claims do not represent limiting features.

Other embodiments of the invention will be apparent to those skilled in the art from consideration of the specification and practice of the invention disclosed herein.

What is claimed is:

1. A method for automatically processing a first electronic document sent from a sender to a designated receiver, the first electronic document including a digital signature, the method comprising:

receiving the first electronic document from the sender;

validating the digital signature by usina a public key of the sender;

checking whether the digital signature is from a person or a legal entity authorized to send the first electronic document;

determining, if the person or the legal entity is authorized to send the first electronic document, whether the person or the legal entity that signed the first electronic document is authorized by an issuer named in the first electronic document to sign the first electronic document;

creating an electronic protocol of the results of validating, checking, and determining;
signing the protocol;
archiving at least one of data selected from the group consisting of the protocol and the first electronic document; and
presenting the first electronic document to the designated receiver.

2. The method of claim 1, further comprising:
converting the first electronic document into a format supported by the designated receiver.

3. The method of claim 1, further comprising:
requesting a time stamp from a trusted authority and adding the time stamp to the first electronic document before archiving.

4. The method of claim 1, further comprising:
requesting a time stamp from a trusted authority and adding the time stamp to the first electronic document before presenting.

5. The method of claim 1, further comprising:
requesting a time stamp from a trusted authority and adding the time stamp to the electronic protocol before signing.

6. The method of claim 1, further comprising:
creating a second digital signature of the first electronic document using a certificate of an authorized person or an authorized legal entity;
creating a second electronic document having the second digital signature; and
presenting the second electronic document to the sender of the first electronic document.

7. The method of claim 6, further comprising:
archiving the second electronic document.

8. The method of claim 1, further comprising:
presenting the archived data to at least one of targets selected from the group consisting of the designated receiver and the sender of the first electronic document.

9. The method of claim 1, wherein the first electronic document is an invoice or a credit note.

10. The method of claim 1, further comprising:
checking, if the first electronic document is a non-repudiation of receipt (NRR) of a credit note previously sent to the sender, whether the NRR matches with the previously sent credit note.

11. The method of claim 1, wherein the method is transparently integrated into an exchange path between a sender application of the sender and a receiver application of the receiver.

12. A computer system for automatically processing a first electronic document sent from a sender to a designated receiver, the first electronic document having a digital signature, the system comprising:
input means for receiving and entering data;
output means for sending and presenting data;
storage means for storing data;
a memory; and
a processor,
wherein the memory and the processor are configured to perform a method comprising:
receiving the first electronic document from the sender;
validating the digital signature by using a public key of the sender;
checking whether the digital signature is from a person or a legal entity authorized to send the first electronic document;
determining, if the person or the legal entity is authorized to send the first electronic document, whether the person or the legal entity that signed the first electronic document is authorized by an issuer named in the first electronic document to sign the first electronic document;
creating an electronic protocol of the results of validating, checking, and determining;
signing the protocol;
archiving at least one of data selected from the group consisting of the protocol and the first electronic document; and
presenting the first electronic document to the designated receiver.

13. The system of claim 12, wherein the method further comprises:
converting the first electronic document into a format supported by the designated receiver.

14. The system of claim 12, wherein the method further comprises:
requesting a time stamp from a trusted authority and adding the time stamp to the first electronic document before archiving.

15. The system of claim 12, wherein the method further comprises:
requesting a time stamp from a trusted authority and adding the time stamp to the first electronic document before presenting.

16. The system of claim 12, wherein the method further comprises:
requesting a time stamp from a trusted authority and adding the time stamp to the electronic protocol before signing.

17. The system of claim 12, wherein the method further comprises:
creating a second digital signature of the first electronic document using a certificate of an authorized person or an authorized legal entity;
creating a second electronic document having the second digital signature; and
presenting the second electronic document to the sender of the first electronic document.

18. The system of claim 17, wherein the method further comprises:
archiving the second electronic document.

19. The system of claim 12, wherein the method further comprises:
presenting the archived data to at least one of targets selected from the group consisting of the designated receiver and the sender of the first electronic document.

20. The system of claim 12, wherein the first electronic document is an invoice or a credit note.

21. The system of claim 12, wherein the method further comprises:
checking, if the first electronic document is a non-repudiation of receipt (NRR) of a credit note previously sent to the sender, whether the NRR matches with the previously sent credit note.

22. The system of claim 12, wherein the system is transparently integrated into an exchange path between a sender application of the sender and a receiver application of the receiver.

23. A computer-readable medium containing instructions for performing a method for automatically processing a first electronic document sent from a sender to a designated receiver, the first electronic document having a digital signature, the method comprising:
receiving the first electronic document from the sender;
validating the digital signature by using a public key of the sender;

checking whether the digital signature is from a person or a legal entity authorized to send the first electronic document;

determining, if the person or the legal entity is authorized to send the first electronic document, whether the person or the legal entity that signed the first electronic document is authorized by an issuer named in the first electronic document to sign the first electronic document;

creating an electronic protocol of the results of validating, checking, and determining;

signing the protocol;

archiving at least one of data selected from the group consisting of the protocol and the first electronic document; and presenting the first electronic document to the designated receiver.

24. The computer-readable medium of claim 23, wherein the method further comprises:

converting the first electronic document into a format supported by the designated receiver.

25. The computer-readable medium of claim 23, wherein the method further comprises:

requesting a time stamp from a trusted authority and adding the time stamp to the first electronic document before archiving.

26. The computer-readable medium of claim 23, wherein the method further comprises:

requesting a time stamp from a trusted authority and adding the time stamp to the first electronic document before presenting.

27. The computer-readable medium of claim 23, wherein the method further comprises:

requesting a time stamp from a trusted authority and adding the time stamp to the electronic protocol before signing.

28. The computer-readable medium of claim 23, wherein the method further comprises:

creating a second digital signature of the first electronic document using a certificate of an authorized person or an authorized legal entity, creating a second electronic document having the second digital signature; and presenting the second electronic document to the sender of the first electronic document.

29. The computer-readable medium of claim 28, wherein the method further comprises:

archiving the second electronic document.

30. The computer-readable medium of claim 23, wherein the method further comprises:

presenting the archived data to at least one of targets selected from the group consisting of the designated receiver and the sender of the first electronic document.

31. The computer-readable medium of claim 23, wherein the first electronic document is an invoice or a credit note.

32. The computer-readable medium of claim 23, wherein the method further comprises:

checking, if the first electronic document is a non-repudiation of receipt (NRR) of a credit note previously sent to the sender, whether the NRR matches with the previously sent credit note.

* * * * *